April 7, 1959

W. H. HARRIES ET AL 2,880,993

CONTINUOUS FILM FEEDER

Filed Nov. 9, 1955

INVENTORS
H. E. Pickens
W. H. Harries
BY
Kimmel & Crowell ATTORNEYS

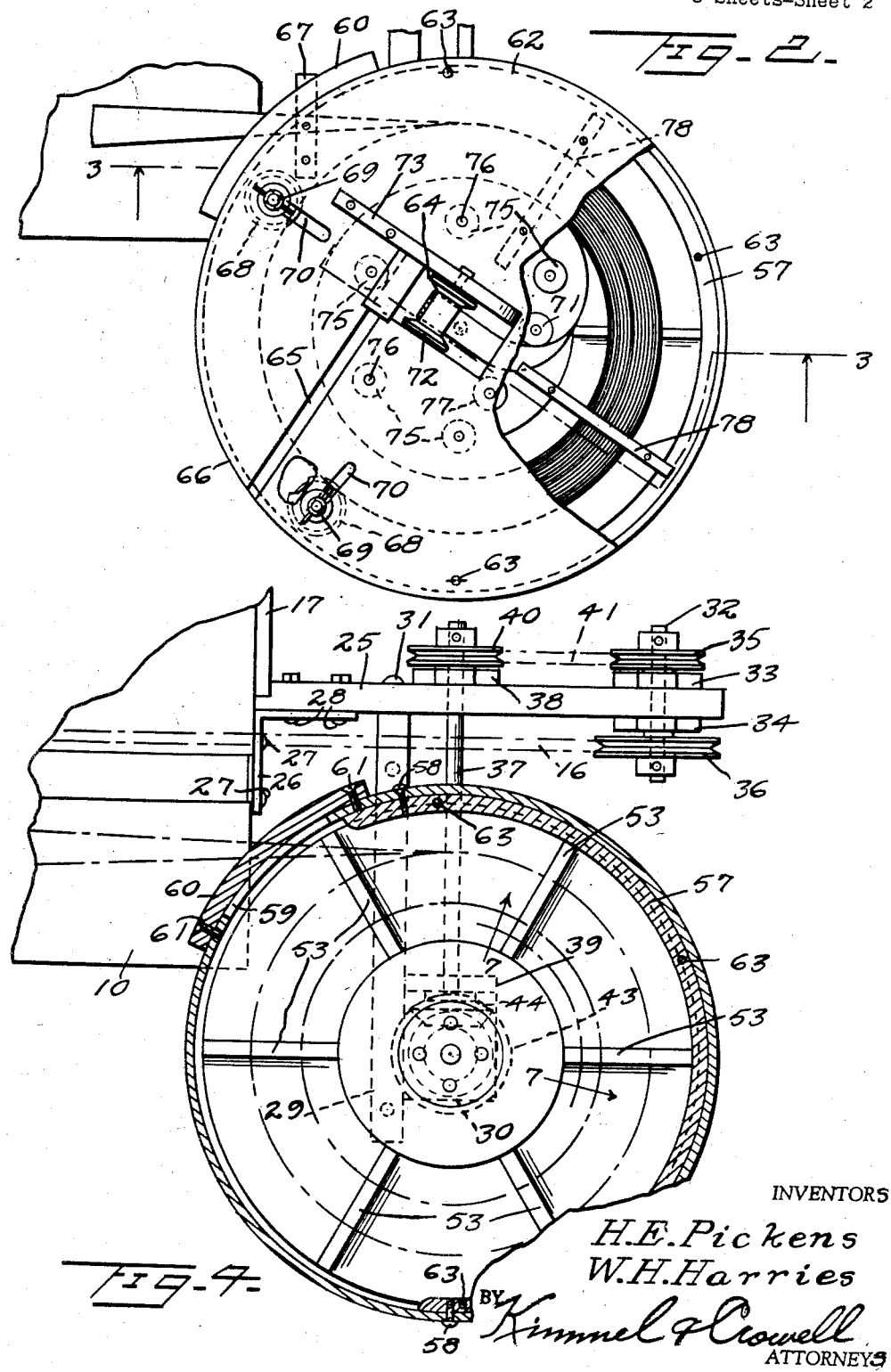

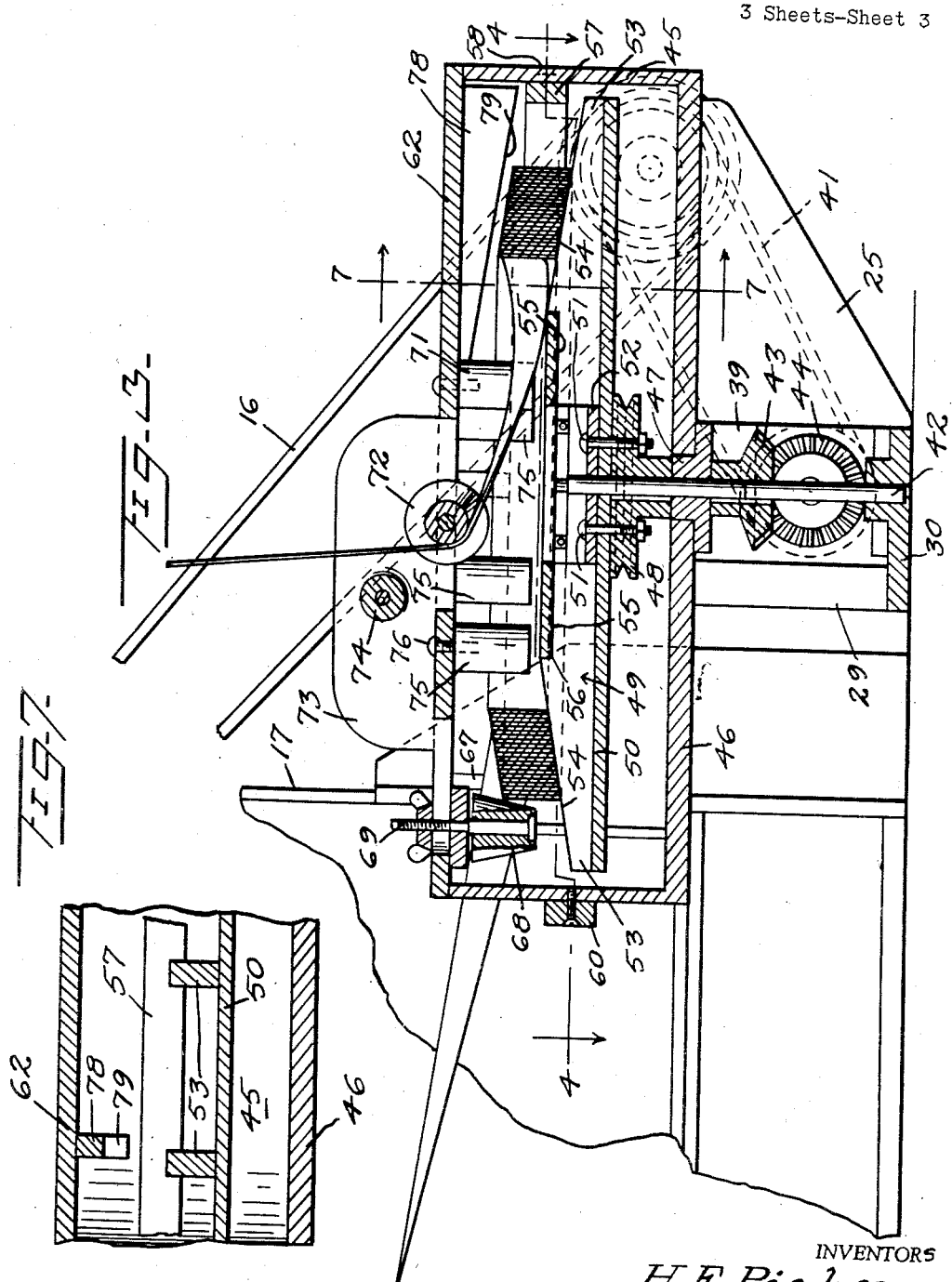

United States Patent Office 2,880,993
Patented Apr. 7, 1959

2,880,993

CONTINUOUS FILM FEEDER

William H. Harries and Herman E. Pickens,
West Hartford, Conn.

Application November 9, 1955, Serial No. 545,983

1 Claim. (Cl. 271—2.18)

The present invention relates to continuous film feeders and more particularly to feeders which are adapted to be attached to and operated by a motion picture projector.

The primary object of the invention is to provide a continuous film feeder of the type having a film take-up reel rotated by the film reel drive belt of the film projector so that the reel is rotated in timed relation to the operation of the projector.

Another object of the invention is to provide a combined projector and film reel structure for supporting and feeding an endless film to the projector to permit the effective use of repetitious endless films in a standard projector.

A further object of the invention is to provide a continuous film supporting reel for attachment to a projector on which the film is maintained in a loose non-binding condition.

A still further object of the invention is to provide a continuous film reel attachment for motion picture projectors driven by the reel drive belt of the projector without modifying the projector in any way.

Other objects and advantages will become apparent in the following specification when considered in the light of the attached drawings, in which:

Figure 2 is a fragmentary enlarged transverse cross section taken along the line 2—2 of Figure 1 looking in the direction of the arrows;

Figure 3 is an enlarged vertical section taken along the line 3—3 of Figure 2 looking in the direction of the arrows with parts broken away for convenience of illustration;

Figure 4 is a horizontal cross section taken along the line 4—4 of Figure 3 looking in the direction of the arrows;

Figure 7 is a fragmentary vertical cross section taken along the line 7—7 of Figure 3 and the line 7—7 of Figure 4 looking in the direction of the arrows.

Figure 1:
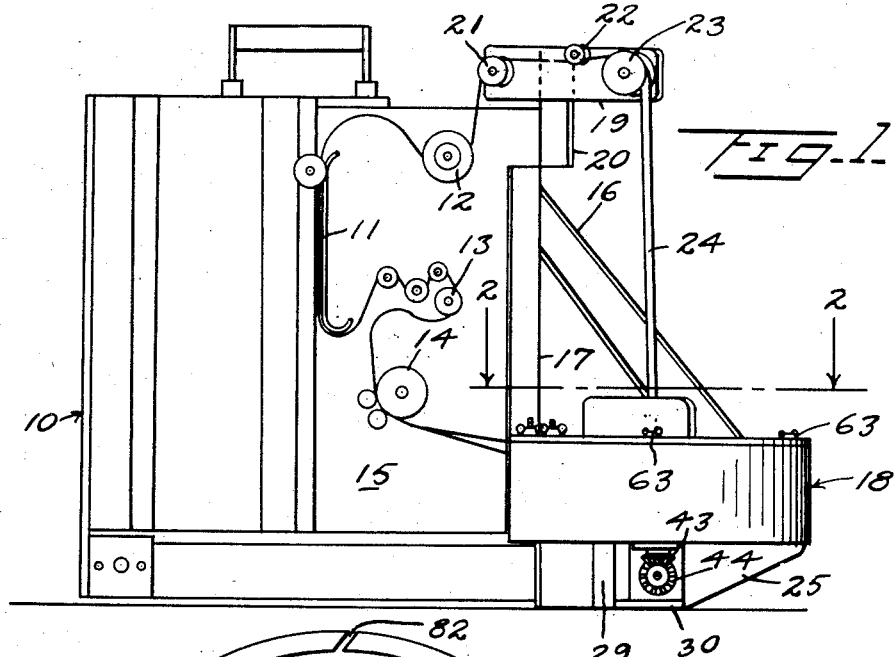
Figure 1 is a side elevation of the invention shown attached to a projector shown partly diagrammatically.
Figure 5:
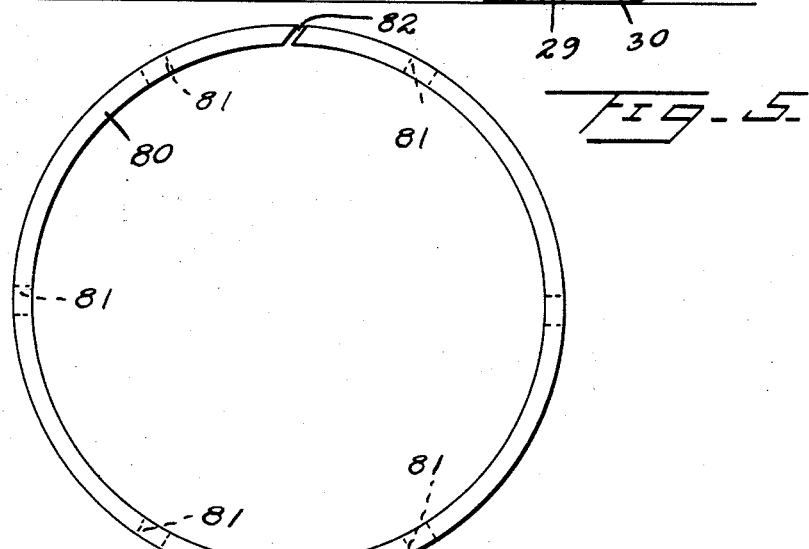
Figure 5 is a top plan view of the loading hub.

Referring now to the drawings in detail wherein like reference numerals indicate like parts throughout the several figures, the reference numeral 10 indicates generally a motion picture projector having a film gate 11, film drive sprocket 12, lower film drive sprocket 14, sound drive sprocket 13, housing 15, film reel drive belt 16 and a front wall 17. The construction of the projector 10 is conventional and forms no part of the present invention except with relation to the combination of such structure with the improved continuous film feeder generally indicated at 18. An offset guide 19 is secured to the upper forward portion of the film projector 10 by means of a bracket 20 and extends at an angle forwardly and outwardly to overlie the center of the film feeder 18. The offset guide 19 is provided with rotatable guide pulleys 21, 22 and 23 over which the film 24 is adapted to be trained. The film 24 is fed through the film track of the projector 10 in a conventional manner on pulley 21. An arm 25 extends forwardly of the film projector 10 and is secured to the forward wall 17 of film projector 10 by means of an angle iron bracket 26 detachably secured to the projector 10 by means of securing elements 27. The angle iron bracket 26 is secured to the arm 25 by bolts 28. An arm 29 extends laterally from the arm 25 and has its lower edge in alignment with the lower edge of the arm 25. A base plate 30 is secured to the outer end portion of the arm 29 and extends forwardly therefrom perpendicular to the arm 29. Arm 29 is secured to the arm 25 by securing elements 31, as illustrated in Figure 4. The lower edge of the arm 29 is secured to the base plate 30 integrally or by any suitable means. A shaft 32 is journaled in the outer end of the arm 25 and supported therein by means of bushings 33 and 34 positioned on opposite sides of the arm 25. A pulley 35 is secured to the shaft 32 on one side of the arm 25 and the second pulley 36 is secured to the shaft 32 on the opposite side of the arm 25. A shaft 37 is journaled in the arm 25 and supported therein by means of a bushing 38 and extends through an upstanding wall 39 secured to the inner edge of the base plate 30. A pulley 40 is secured to the shaft 37 on the side of the arm 25 bearing the pulley 35 with the pulleys 35 and 40 being in alignment and connected by a flexible belt 41. A shaft 42 is journaled at its lower end in base plate 30. A beveled gear 43 is secured to the shaft 42 and is adapted to mesh with a beveled gear 44 carried by the shaft 37. The drive belt 16 of the projector 10 is adapted to engage the pulley 36 in driving relation thereto.

A cylindrical housing 45 is provided with an integral bottom wall 46 which is supported on and secured to the arm 29 as illustrated in Figure 3. The bottom wall 46 is provided with a bushing 47 and has the shaft 42 extending a substantial distance above the bottom wall 46. A hub 48 is secured to the shaft 42 and carries a film reel generally indicated at 49 on the upper face thereof. The film reel 49 includes a disk 50 secured to the hub 48 by means of bolts 51 extending downwardly through a clamping plate 52 in engagement with the top face of the disk 50. A plurality of film supporting bars 53 are secured to and extend upwardly from the disk 50. The bars 53 extend radially of the disk 50 and each having an inwardly and upwardly tapering top wall 54 terminating in a downwardly offset portion 55 which extends parallel to the disk 50. A ring 56 is supported in the downwardly offset portions 55 of each of the bars 53 to provide a continuous inner top surface for the reel 49. A film guide 57 is secured to the inner surface of the housing 45 by securing pins 58 and is positioned above the outer ends of the bars 53 to serve as a film guide to prevent the film from leaving the upper surface 54 of the bars 53, the guide 57 extending over half way about the housing 45. The housing 45 is provided with a film entrance slot or gate 59 in the side wall 45 of the housing adjacent the projector 10. A support bar 60 is positioned adjacent the lower edge of the slot 59 and secured to the housing 45 by securing pins 61. The housing 45 is provided with a circular cover 62 which is detachably secured thereto by wing bolts 63 engaging downwardly through the guide plate 57 as illustrated in Figures 2 and 4. The cover 62 is provided with a generally rectangular central opening 64 and a slot 65 extending from the peripheral edge 66 of the cover 62 to the opening 64. The slot 65 providing means to permit the removal and replacement of the cover 62 about a continuous film contained in the housing 45. A guide bar 67 is secured to the underside of the cover 62 in overlying relation to the slot 59 and provides a surface engagement by the film to align the film for admission to the reel 49. A pair of tapered rollers 68 are journaled on bolts 69 extending through slots 70 in the cover 62, the tapered rollers 68 being adapted to engage the film on the reel 49 to assist in maintaining the film thereon. A vertical guide roller 71 is journaled for rotation in depending relation on the cover 62 and is positioned adjacent one end of the rectangular opening 64 to provide a rotating guide for the film moving toward the rectangular opening 64. A horizontal pulley 72 is rotatably mounted on a side plate 73 supported in an upright position adjacent the rectangular opening 64. The pulley 72 is centrally positioned with respect to the opening 64 and extends partially therethrough. A second horizontal guide pulley 74 is likewise journaled to the plate 73 for assisting in guiding the film passing through the rectangular opening 64. A plurality of stationary guide bosses 75 are positioned in an arc about the opening 64 and are secured to the underside of the cover 62 by means of securing elements 76. Another stationary guide bushing 77 is mounted in depending relation to the cover 62 adjacent the opening 64 in spaced apart relation to the rotatable guide 71 to maintain the film within the confines of the opening 64. The cover 62 is further provided with a pair of guide bars 78 which are detachably secured to the underside of the cover 62 and having inwardly and upwardly tapering bottom wall 79 with the bottom wall 79 extending generally parallel to the top wall 54 of the bars 53. In the loading of the reel 49 prior to the film being spliced into a continuous form, a loading ring 80 having a plurality of slots 81 formed in its lower edge is positioned on the reel 49 with the slots 81 engaging over the bars 53. A beveled slot 82 is formed in the ring 80 and extends from the top to the bottom edge thereof providing a locking slot for the end of the film being loaded on the reel 49.

Figure 6:
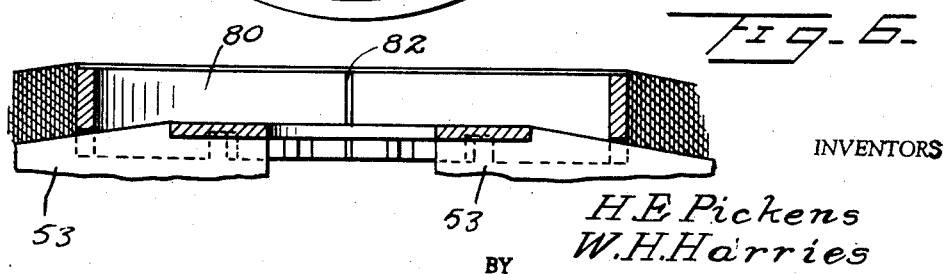
Figure 6 is a transverse cross section of the loading hub illustrating its cooperation with the film and film reel.

In the use and operation of the invention initially the ring 80 is positioned on the reel 49 as illustrated in Figure 6 and an end of a strip of film extending from the film track of the projector 10 is fed through the slot 59 and into the slot 82. Rotation of the reel 49 in a clockwise direction as viewed in Figures 2 and 4 will wind the film about he loading ring 80 until the reel 49 is loaded. Tthe loading ring 80 is then removed from the reel 49 and the innermost end of the film is pulled upwardly and spliced to the opposite end of the film previous to its passing through the projector 10. The cover 62 is then moved into position by passing the film through the slot 65 into the central opening 64 into engagement with the pulley 72. The cover is then lowered into position against the housing 45 and secured thereto by thumb bolt 63 with the film positioned outside of the guides 75 and extending between the guides 71 and 77. The projector reel drive belt 16 is connected to the pulley 36 and the projector 10 is then operated with the film feeding from the center of the film reel 49 to the projector 10 and from the projector 10 to the outside of the reel 49. All film engaging surfaces of the device are highly polished to reduce the frictional contact of the film therewith. The movement of the film by the driving of the reel 49 creates a center ejection of the film caused by the effort of the film leaving the interior portion of the coil to attain and maintain the same linear rate of speed as the film entering the coil where it has a somewhat larger diameter. The film and the coil in the instant invention tends to remain relatively loose without involving undue frictional slippage between the adjacent wraps in the coil. The film moves upwardly on the bars 53 from the outermost position thereon at the point where the film enters the reel 49 to the innermost position thereon where the film leaves the reel 49. The guides 57, 68 and 79 act to maintain the film in alignment on the reel 49 while the guides 71, 75 and 77 guide the film as it leaves the reel 49.

Having thus described the preferred embodiments of the invention, it should be understood that numerous modifications and structural adaptations may be resorted to without departing from the scope of the appended claim.

What is claimed is:

A continuous film feeder attachment for film projectors of the type having a film reel belt and film feeding sprockets comprising, a horizontal housing having a bottom wall and an upwardly extending side wall secured thereto, a bracket structure detachably secured to said projector supporting said housing adjacent thereto, a vertical shaft extending axially of said housing with its lower end journalled in said bracket structure, means in the bottom wall of said housing journalling said shaft intermediate the opposite ends thereof, means carried by said bracket structure connecting said vertical shaft with said film reel belt for rotating said vertical shaft, a reel rotatably mounted in said housing and fixed to said shaft, said reel including a flat horizontal disk and a plurality of radially extending bars fixed to said disk and projecting upwardly therefrom, said bars tapering downwardly and outwardly from a point adjacent their inner ends to their outer ends, an arcuate film guide fixed to the side wall of said housing within said housing and arranged in overlying relation to the outer end portion of said bars, a cover panel, means detachably securing said cover panel to the top of said housing parallel to the bottom wall thereof, film guide bars secured to said cover in depending radially extending relation and having their lower edges arranged parallel to the tapering upper edges of said bars on said reel, said cover having a central rectangular opening and a slot extending from said opening to the peripheral edge of said cover, an upright side plate secured to said cover adjacent one side of said opening oppositely of said slot, a horizontal film guide roller journalled on said side plate centrally of said opening, a plurality of stationary depending guide bosses fixed to said cover in circumferentially spaced relation along a circle coaxial with said disk, a guide roller journalled on a vertical axis in depending relation on said cover adjacent one end of said opening, a pair of tapering rollers having their largest diameter uppermost, and means including a vertical shaft journalling and supporting said tapering rollers for radial adjustment in depending relation on said cover in overlying relation to the outer edge portion of said reel, said tapering rollers engaging the outer periphery of the film wound on said reel to maintain the film in coiled condition on the reel, said side wall having a film entrance slot formed therein adjacent said projector.

References Cited in the file of this patent
UNITED STATES PATENTS

| 887,431 | Sandell | May 12, 1908 |
| 2,279,022 | Duskes | Apr. 7, 1942 |
| 2,398,639 | Heyer | Apr. 16, 1946 |
| 2,740,628 | Small | Apr. 3, 1956 |
| 2,781,689 | Heyer | Feb. 19, 1957 |

FOREIGN PATENTS

| 177,963 | Great Britain | Apr. 13, 1922 |
| 325,083 | Great Britain | Feb. 13, 1930 |
| 401,590 | Great Britain | Nov. 16, 1933 |
| 496,974 | Great Britain | Dec. 9, 1938 |
| 134,713 | Austria | Sept. 25, 1933 |
| 904,697 | France | Mar. 12, 1945 |